Nov. 2, 1943.    P. S. DICKEY ET AL    2,333,300
MEASURING SYSTEM
Filed June 14, 1941    2 Sheets-Sheet 1

Inventors
PAUL S. DICKEY AND
ROBERT W. BOARMAN
By Raymond N. Junkins
Attorney

Nov. 2, 1943.  P. S. DICKEY ET AL  2,333,300
MEASURING SYSTEM
Filed June 14, 1941  2 Sheets-Sheet 2

Inventors
PAUL S. DICKEY AND
ROBERT W. BOARMAN
By Raymond W. Junkins
Attorney

Patented Nov. 2, 1943

2,333,300

UNITED STATES PATENT OFFICE 2,333,300

MEASURING SYSTEM

Paul S. Dickey, Shaker Heights, Ohio, and Robert W. Boarman, Nutley, N. J., assignors to Bailey Meter Company, a corporation of Delaware Application June 14, 1941, Serial No. 398,170

7 Claims. (Cl. 116—65)

This invention relates to systems for indicating, recording, or otherwise exhibiting the value of a position, measurement, or variable. More particularly our invention relates to such systems wherein a pneumatic pressure is employed to operate the exhibiting device.

In accordance with our invention we establish a pneumatic loading pressure corresponding in magnitude to the value of the position, measurement, or variable, and exhibit the magnitude of the loading pressure.

Our invention is particularly adapted to telemetering a value to an adjacent or remote point; or for amplifying the power of a responsive device, such as a Bourdon spring, flow meter, or the like, so that an exhibiting device may be accurately positioned.

One object of our invention is to provide a pneumatically operated power amplifier whereby the available power of a responsive device, such as a Bourdon spring for positioning an exhibiting means or performing other useful work is increased.

A further object of our invention is to provide a pneumatically operated telemetering system whereby the value of a variable, the position of a movable member or the like may be exhibited at a point remote from the point of measurement.

It will be apparent as the description proceeds that our invention may be put to a wide variety of uses, as for exhibiting the value of a temperature, pressure, relative humidity, electromotive force, or for transmitting commands or other intelligence, all of which are to be considered as coming within the scope of our invention.

Figure 1:
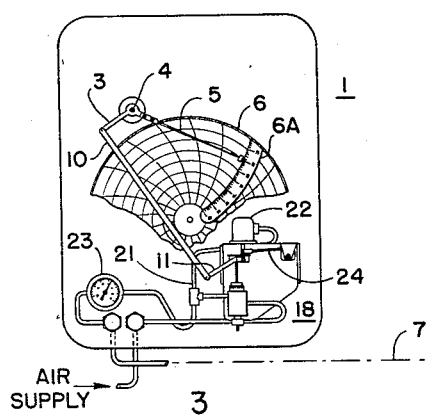
Fig. 1 represents somewhat diagrammatically a pneumatic telemetric system embodying our invention.
Figure 1:
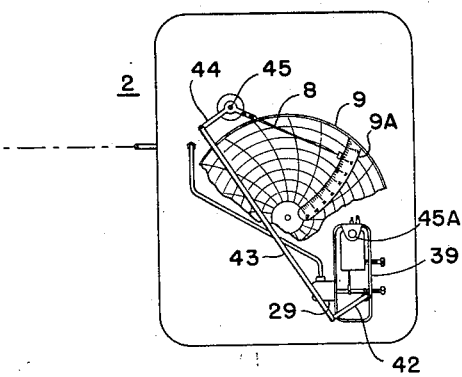

Referring to Fig. 1, we therein show our invention incorporated in a pneumatic telemetering system comprising a transmitter and receiver generally indicated at 1 and 2 respectively. The transmitter 1 is usually located at the point of measurement, whereas the receiver 2 may be located adjacent the transmitter or a considerable distance therefrom, in the order of several hundred feet or more. Within the transmitter 1 is a drive arm 3 angularly positionable within predetermined limits about a pivot 4. The drive arm 3 may be positioned by any suitable means (not shown) in accordance with changes in the magnitude of the variable which it is desired to exhibit. Likewise the drive arm 3 may be manually positioned, each position representing a certain command or other intelligence, so that such intelligence may be exhibited at the receiver. Conveniently a movable index 5 may be positioned by and with the drive arm 3, which in cooperation with a graduated chart 6 and scale 6A will exhibit at the transmitter the magnitude of the variable or intelligence which is being transmitted to the receiver. As will be understood by those familiar with the art, the chart 6 may be rotated by any suitable timing means (not shown) and the index 5 arranged to inscribe a record thereon so that the value of the variable which existed at any previous time, or the intelligence transmitted at any previous time, may be readily ascertained.

The transmitter 1, through movements of the drive arm 3, is adapted to establish a pneumatic loading pressure corresponding to the magnitude of the variable or intelligence which is to be transmitted. The pneumatic loading pressure so established is transmitted through a connecting pipe schematically indicated at 7 to the receiver 2. Within the receiver 2 is a suitable mechanism for translating changes in the loading pressure into changes in the position of a suitable index 8, which in the embodiment of our invention illustrated, cooperates with a suitably graduated chart 9 and scale 9A to exhibit the value of the variable or intelligence being transmitted. As explained with reference to the transmitter 1 the chart 9 may be rotated by any suitable timing means so that the value of the variable or the intelligence transmitted at any previous time may be readily determined. The specific exhibiting means which we have shown should however be taken merely as illustrative, it being evident that such means are capable of a wide variety of modifications.

Figure 2:
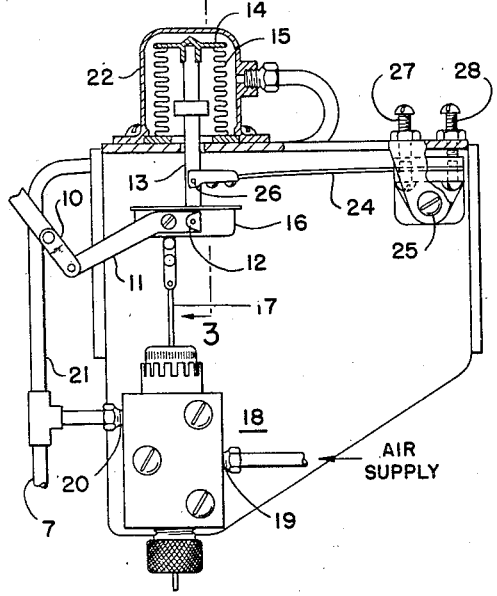
Fig. 2 illustrates to larger size and in greater detail the transmitting mechanism shown in Fig. 1.

The drive arm 3, through a connecting rod 10, angularly positions an arm 11 about a pivot 12 (Fig. 2). Movements of the arm 11 are therefore coincident with and of the same order or magnitude as movements of the drive arm 3.

The pivot 12 is secured to a push rod 13 which is, at it upper end, secured to the movable head 14 of an expansible contractible chamber shown as a Sylphon 15. The pivot 12 supports a boat 16 to which is secured the arm 11. Pivotally connected to the boat 16 is a movable valve member 17 of a pilot valve generally indicated at 18.

The pilot valve 18 is more fully disclosed, and is claimed, in the patent to Johnson 2,054,464, granted September 15, 1936. It is sufficient for the present disclosure to say that compressed air at a suitable pressure is admitted to the pilot 18 through an inlet port 19 and that the pilot 18 establishes at an outlet port 20 a loading pressure corresponding to the position of the movable valve member 17. That is to say for each and every position of the movable valve member 17 between predetermined limits there will be a definite loading pressure established at the outlet port 20.

Loading pressures established by the pilot 18 are transmitted through a pipe 21 to the interior of a housing 22 in which is disposed the Sylphon 15. Likewise pressures established by the pilot 18 are transmitted through the pipe 7 to the receiver 2. A suitable pressure gage, such as indicated at 23, may be connected in the pipe 7 so that an indication of the loading pressure being transmitted to the receiver may be obtained.

The loading pressure within the housing 22 acts to cause the movable head 14 of the Sylphon 15 to be positioned downwardly. The force of the loading pressure upon the movable head 14 is opposed by a cantilever spring 24 having one end secured to a bearing support 25 and its free end pivotally connected to the push rod 13. It is, therefore, apparent that for each and every pressure existing within the housing 22 there will be a definite position assumed by the push rod 13 and accordingly of the pivot 12.

In operation, assuming the drive arm 3 is positioned in a counterclockwise direction, the movable valve member 17 will be positioned downwardly. The loading pressure established at the outlet port 20 by the pilot valve 18 will decrease, causing the movable head 14 to move upwardly, and likewise the valve member 17. It is thus apparent that equilibrium will be restored when the decrease in loading pressure established by the pilot valve 18 is proportional to the counterclockwise movement of the drive arm 3. Conversely upon the drive arm 3 being positioned in a clockwise direction, thereby causing the movable valve member 17 to move upwardly, the loading pressure established at the outlet port 20 will increase proportionately. This increase in loading pressure will cause the movable head 14 to move downwardly and equilibrium will be restored when the increase in pressure produced by the pilot valve 18 is proportional to the clockwise movement of the drive arm 3.

It is apparent that for each and every position of the drive arm 3 there will be a definite loading pressure established by the pilot 18, and that in the embodiment of our invention shown in Figs. 1 and 2 when the index 5 is at the maximum graduation of the chart 6 the loading pressure will be at a minimum, whereas when the movable index 5 is at the minimum graduation of the chart 6 the loading pressure will be at a maximum. By proper arrangement of the drive arm 3, connecting rod 10 and arm 11, this may be reversed so that the loading pressure established by the pilot 18 will vary in direct proportion to movements of the index 5 outwardly from the center of the chart 6 rather than in inverse proportion thereto. It will further be noted that the Sylphon 15 and spring 24 in effect comprise a fluid pressure weighing device so that for each and every position of the drive arm 3 a definite loading pressure will be established regardless of variations in the pressure of the air supplied the pilot valve 18.

To facilitate manufacture it is usually preferable that each transmitting unit, such as illustrated generally at 1, be arranged so that with the movable index 5 at the maximum graduation a predetermined definite loading pressure, say for example, 5 pounds per square inch, will be established by the pilot 18. In order to provide for the initial loading of the bellows 15, we show the cantilever spring 24 pivotally mounted on the bearing support 25 and arranged to be held in any given position by the lock screws 27 and 28. With the movable index 5 on the maximum graduation of the chart 6, by means of screws 27 and 28 the cantilever spring 24 may be adjusted so that a loading pressure of five pounds per square inch is established by the pilot 18. Because of minor variations in spring characteristics, and also because of variations in the spring characteristics of Sylphons such as shown at 24 and 15 respectively, the maximum loading pressure established by the pilot 18 may vary from one unit to another. As hereinafter explained more in detail, we provide suitable means in the receiver whereby a definite movement of the receiver index 8 will be produced when the index 5 and movable drive arm 3 are moved through their travels.

Figure 4:
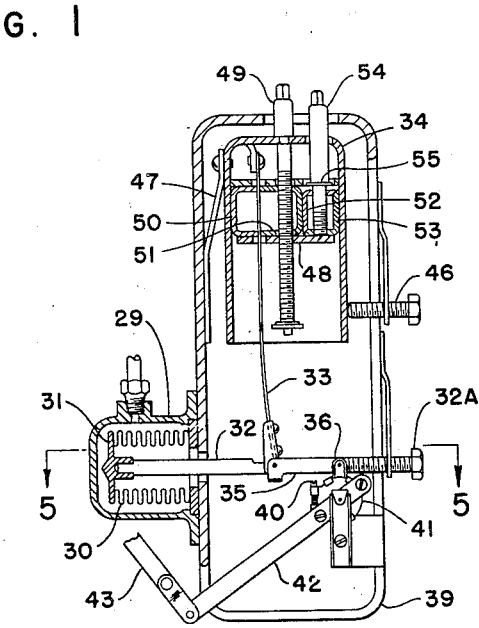
Fig. 4 is an elevational cross-sectional view to larger size of the receiving mechanism shown in Fig. 1.
Figure 5:
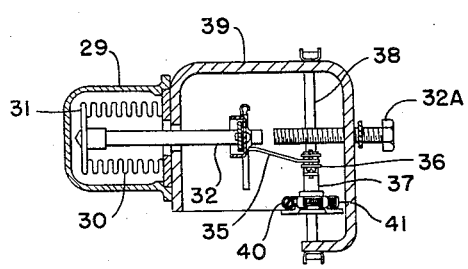
Fig. 5 is a view along the line 5—5 of Fig. 4 in the direction of the arrows.

Referring now to the receiver shown generally at 2 in Fig. 1 and in detail in Figs. 4 and 5, the loading pressure established by the transmitter 1 is transmitted to the interior of a housing 29 in which is disposed an expansible contractible Sylphon 30 having a movable head 31. Secured to the movable head 31 is a push rod 32 to which is pivotally fastened a cantilever spring 33 secured at its opposite end in a cradle 34. As the loading pressure established by the pilot valve 18 increases, the push rod 32 will be positioned proportionately to the right as shown in Fig. 4 against the force produced by the cantilever spring 33.

The push rod 32 carries an extension 35 pivoted to an arm 36 secured to a sleeve 37 journaled on a pin 38 pivotally mounted in a housing 39.

Also secured to the sleeve 37 is a manually adjustable worm 40 meshing with a worm wheel 41 journaled on the sleeve 37. Secured to and rotatable with the worm wheel 41 is an arm 42 pivotally connected to a connecting rod 43, in turn pivotally connected to a drive arm 44 oscillatable about a support 45. The index 8 is secured to the movable drive arm 44. In general, it will be seen that as the movable head 31 is positioned to the right by virtue of an increase in pressure, the index 8 will move toward the center of the chart 9, and that for each and every loading pressure transmitted to the receiver 2 there will be a definite position of the index 8.

Manual adjustment of the worm 40 positions the arm 42 relative to the sleeve 37 and affords a means of adjusting the index 8 for a given position of the Sylphon head 31. This adjustment provides a convenient means for initially bringing the index 8 into correspondence with the position of the index 5 when a given loading pressure is established by the pilot 18.

As heretofore noted it is desirable that the range of movement of the push rod 32 for a given change in loading pressure established by the pilot valve 18 be adjustable so that a desired movement of the index 8 may be obtained. To so vary or adjust the movement of the index 8 we provide a means, as shown in Fig. 4, for varying the effective length of the cantilever spring 33. As illustrated in Fig. 4 we provide a device for varying the effective length of the cantilever spring 33 as disclosed and claimed in United States Patent 2,184,163 dated December 19, 1939 to Frederick A. Barnes.

The cradle 34 in which the cantilever spring 33 is secured is pivotally mounted at 45A (Fig. 1) to the housing 39. The cradle 34 is urged against an adjustable stop 46 by a spring 47. This adjustment provides a means for initially loading the Sylphon 30 so that for any given pressure therein, say for example five pounds, the index 8 will be at the maximum, minimum or any other desired graduation on the chart 9.

Within the cradle 34 is an open ended carriage 48 movable longitudinally by a screw 49 journaled to the cradle. The spring 33 passes through the carriage 48 through suitable slots. Within the carriage is a hollow rectangular cup shaped member 50, one side of which engages the wall of the cradle 34 and the edges of which engage the spring 33. On the opposite side of the spring 33 is a similar cup shaped member 51, the edges of which engage the spring. Lying adjacent the wall of the member 51 is a hollow triangular member 52 mating with a similar member 53 having a side engaging the wall of the cradle 34. Threaded into the triangular shaped member 53 is a manually adjustable screw 54 having a collar or thrust bearing 55 located between the upper wall of the carriage 48 and triangular shaped member 52. The screw 54 passes through the carriage 48 and member 52 through enlarged openings so that the member 52 is free to slide laterally with respect to the member 53. Rotation of the screw 54 in one direction tends to move the member 53 upwardly causing the member 52 to move to the left as viewed in the drawing, thereby locking cup shaped members 50 and 51 against the spring 33. The triangular shaped members 52 and 53 act in other words as an expanding member upon manipulation of the screw 54 locking the carriage 48 in the position it then occupies and causing the cup shaped members 50 and 51 to firmly engage the spring 33.

The position of the carriage 48 determines the free or effective length of the spring 33 and thereby controls or determines the range in loading pressure within the housing 29 required to position the index 8 between desired travel limits. For example, as the carriage 48 is positioned downwardly as shown in Fig. 4 the effective length of the spring 33 decreases, thereby increasing opposition to movement of the push rod 32 and requiring a greater range in loading pressure within the housing 29 to position the index 8 from minimum to maximum position. Conversely, as the carriage 48 is positioned upwardly, the effective length of the spring 33 is increased, thereby decreasing the range in loading pressure required to position the index 8 from minimum to maximum position.

The carriage 48 and associated devices provide a simple and convenient means for calibrating the receiver 2 so that the index 8 properly responds to the loading pressures established in the transmitter 1. The index 8 is readily brought to the initial or starting position relative to the chart 9 by proper manipulation of the screw 46 and correct movement of the index 8 for a given range in loading pressures is obtained through proper manipulation of screws 49 and 54. Excepting the time when the screw 49 is being manipulated the screw 54 provides a convenient means for locking the carriage 48 in position and definitely setting or defining the effective length of the spring 33.

As heretofore explained, the worm 40 may also be used to initially adjust the position of the index 8 and it may also be used as a means for providing desired angularity between the moving parts in order that the index 8 will be positioned accurately throughout its range of movement.

An adjustable stop screw 32A may be provided to limit the motion of the Sylphon 30. As known, a Sylphon, upon over distortion, retains a permanent set. The screw 32A provides a convenient means for limiting the motion of the Sylphon to within its operating range.

Figure 6:
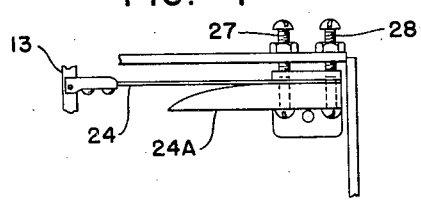
Fig. 6 illustrates a modification of a part of the transmitting mechanism shown in Fig. 2.

In some applications of our invention it is desirable that the loading pressures established by the pilot valve 18 bear a non-linear functional relation to angular movements of the drive arm 3 and index 5. Thus, for example, if the drive arm 3 is positioned in direct proportion to the differential pressure produced by an orifice installed in a pipe, which differential pressure, as known, varies as the square of the rate of fluid flow through the pipe, it is desirable that the loading pressures established vary as the square root of the movements of the drive arm 3 so that the index 8 in the receiver 2 will be positioned in direct proportion to the rate of flow rather than in proportion to the square thereof. In Fig. 6 we illustrate a modification of the transmitting mechanism whereby the effective length of the spring 24 may be progressively varied as the push rod 13 is positioned downwardly. Therein we show a shaped member 24A, the convexly curved upper surface of which is adapted to engage the spring 24 and determine a bending point as the free end thereof is positioned downwardly. The upper surface of the member 24A may be given any desired shape so that the change in loading pressure within the housing 22 required to position the push rod 13 a given incremental amount will progressively vary. Thus, in the example suggested, the member 24A would be shaped so that the loading pressure established by the pilot valve 18 would vary as the square root of the movements of the drive arm 3 from that position existing when zero flow existed through the orifice.

In Fig. 1 in the transmitter 1, we illustrate the index 5 secured to and movable with the drive arm 3. Certain responsive devices, such for example as Bourdon springs, have an exceedingly small amount of power available. Frequently the additional load imposed upon such a device by an index, such as the index 5, is sufficient to materially decrease the accuracy with which it is positioned. Accordingly, when the transmitting mechanism is positioned by such a device we provide an arrangement such as shown in Fig. 7 or Fig. 8 whereby ample power is provided for positioning the index and no appreciable load is placed upon the responsive device.

Figure 7:
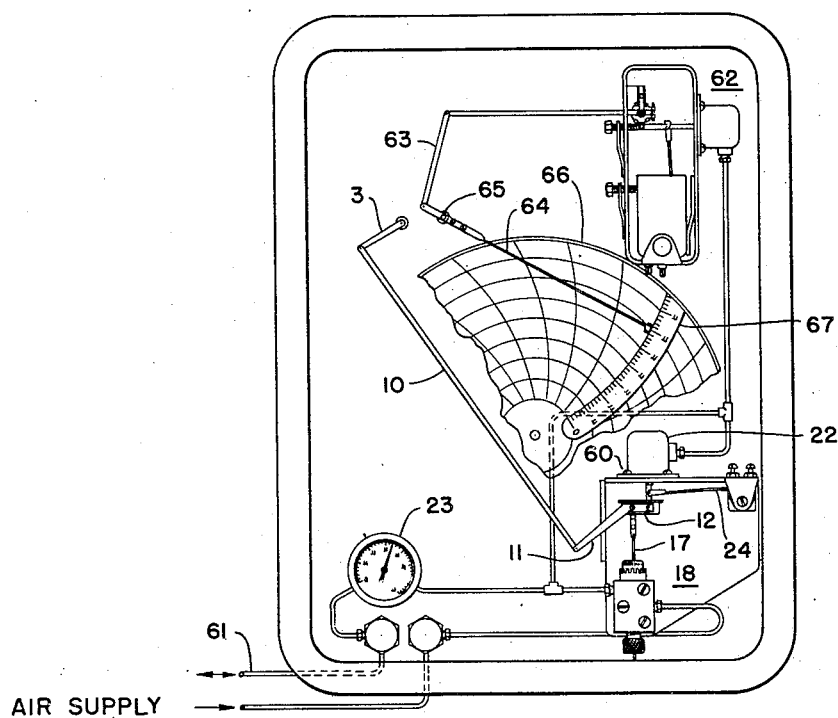
Figs. 7 and 8 illustrate modified forms of our invention.

Referring to Fig. 7, we therein show a transmitter generally indicated at 60 which is adapted to establish, as heretofore described, a loading pressure which may be transmitted through a pipe 61 to one or more receivers (not shown). Incorporated in the transmitter 60 is a receiver mechanism 62 similar to that illustrated in Fig. 4 and previously described. The receiver mechanism 62 positions an arm 63 pivotally connected to a movable index 64, which is supported by a bearing 65. It is evident that clockwise or counter-clockwise movements of the arm 63 in response to changes in loading pressure transmitted to the mechanism 62 will impart similar movements to the index 64. A suitable cooperating chart 66 and scale 67 may be provided to give a visual indication of the value of the condition actuating the drive arm 3.

Figure 8:
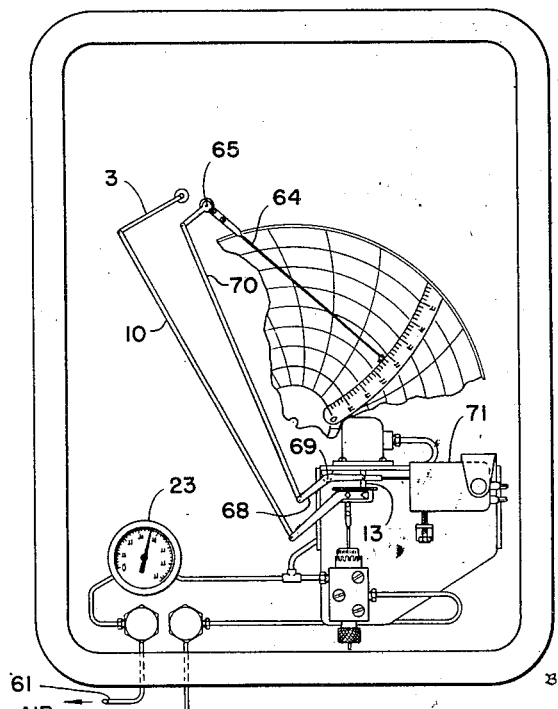
Figure 3:
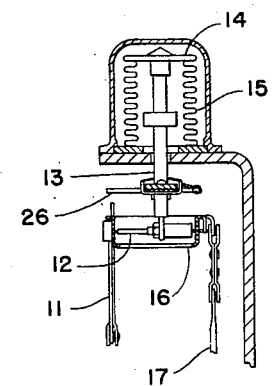
Fig. 3 is a fragmentary view along the line 3—3 of Fig. 2 in the direction of the arrows.

In Fig. 8 we illustrate an alternate arrangement wherein the index 64 is positioned by the push rod 13 through a bell crank 68 pivotally supported at 69 and operatively connected to the index 64 through a connecting rod 70. As shown, downward movements of the push rod 13 will cause corresponding movements of the index 64 about the pivot support 65, and conversely upward movement of the push rod 13 will effect upward movement of the index 64.

As in the embodiment of our invention illustrated in Fig. 8 the index 64 is positioned directly from the transmitting mechanism, we provide the latter with the devices for varying the effective spring length illustrated and described with reference to Fig. 4, and which, in Fig. 8, we have generally indicated at 71.

While in accordance with the patent statutes we have illustrated and described particular embodiments of our invention, it will be evident to those skilled in the art that it may be incorporated in various other devices and is capable of different modifications. Accordingly, the illustrated and described embodiments should be taken as merely illustrative and limited only by the spirit and scope of the appended claims.

What we claim as new, and desire to secure by Letters Patent of the United States, is:

1. A transmitter for a pneumatic telemetering system, comprising in combination, a movable member, an expansible contractible pressure chamber, a calibrating spring urging said chamber to a contracted position and permitting said chamber to expand in correspondence with changes in pressure in the chamber, means for progressively varying the resistance of said spring in a non-linear relation to the change in pressure in said chamber, a pneumatic pilot valve having relatively movable elements for governing the pressure in said chamber, and means under the joint control of said first named member and the expansion of said chamber for relatively moving said elements so that a non-linear relation exists between the pressure in said chamber and the position of said first named member.

2. A transmitter for a penumatic telemetering system, comprising in combination, an expansible contractible chamber having a movable wall, a cantilever spring having one end fixed and the other bearing against said movable wall so that the position of said movable wall is varied in correspondence with changes in pressure in said chamber, means for progressively varying the length of said spring as the pressure in said chamber increases, a pneumatic pilot valve having a port communicating with said chamber, a valve member movable relative to said port for governing the pressure in said chamber, and operating means for said valve member comprising a lever pivotally connected to said valve member and two operating connections to said lever each adapted to provide a lever fulcrum for movement of the valve member by the other, a member for positioning one of said connections and the other being moved in accordance with movement of said wall so that the pressure in said chamber varies in non-linear functional relation with changes in the position of said member.

3. A transmitter for a pneumatic telemetering system, comprising in combination, an expansible contractible chamber having a movable wall, a spring operatively connected to said wall for producing a displacement thereof from an initial position in accordance with the magnitude of the pressure in the chamber, means for progressively varying the effective length of said spring so that the position of said wall varies in non-linear functional relation with the pressure in the chamber, a pneumatic pilot valve having a port communicating with said chamber, a valve member movable relative to said port for governing the pressure in said chamber, a member movable independently of the pressure in said chamber, and means for positioning said valve member under the joint control of said member and wall so that a non-linear functional relation exists between the pressure in the chamber and the position of said movable member.

4. A pneumatic torque amplifier for a member positionable between predetermined limits in response to a variable which is capable of developing only a relatively small amount of power, comprising in combination, an expansible contractible chamber, a cantilever spring urging said chamber to a contracted position and permitting said chamber to expand in proportion to the magnitude of the pressure in the chamber, a pneumatic pilot valve having a port communicating with said chamber, a valve member movable relative to said port for governing the pressure in said chamber, and operating means for said valve member comprising a lever pivotally connected to said valve member and two operating connections to said lever each adapted to provide a lever fulcrum whereby movement may be imparted to the valve member, said valve member being connected to one of said operating connections which is also adapted to be connected to said positionable member and said expansible contractible chamber to the other operating connection, movable exhibiting means, additional means responsive to changes in pressure in said expansible contractible chamber for moving the exhibiting means, and means for varying the movement of said exhibiting means for a given change of pressure in said expansible contractible chamber comprising means for varying the effective length of said cantilever spring.

5. Apparatus for establishing a pneumatic loading pressure corresponding to the position of a movable member, comprising in combination, an expansible contractible chamber having a movable wall, a spring operatively connected to said wall for producing a displacement thereof from an initial position in accordance with the magnitude of the pressure in the chamber, means for progressively varying the resistance of said spring so that the position of said wall varies in non-linear functional relation with the pressure in the chamber, a pneumatic pilot valve having a port communicating with said chamber, a valve member movable relative to said port for governing the pressure in said chamber, and means for positioning said valve member under the joint control of said movable member and wall so that a non-linear functional relation exists between the pressure in the chamber and the position of said movable member.

6. A transmitter for a pneumatic telemetering system, comprising in combination, an expansible contractible chamber having a movable wall, a cantilever spring having one end fixed and the other bearing against said movable wall so that the position of said movable wall is varied in correspondence with changes in pressure in said chamber, means including a convexly curved member engaging the spring adjacent its fixed end for progressively diminishing the length of said spring as the pressure in said chamber increases, a pneumatic pilot valve having a port communicating with said chamber, a valve member movable relative to said port for governing the pressure in said chamber, operating means for said valve member comprising a lever pivotally connected to said valve member and two operating connections to said lever each adapted to provide a lever fulcrum for movement of the valve member by the other, and a member for positioning one of said connections and the other being moved in accordance with movement of said wall so that the pressure in said chamber varies in non-linear functional relation with changes in the position of said member.

7. A pneumatic telemetering system for measuring and indicating devices, comprising in combination, a transmitter, a receiver, and a pneumatic pressure transmitting conduit between said transmitter and receiver, said transmitter including a member positionable between predetermined limits in response to a variable which is capable of developing only a relatively small amount of power, an expansible contractible chamber in communication with the pneumatic pressure transmitting conduit, a spring urging said chamber to a contracted position and permitting said chamber to expand in proportion to increase of pressure in the chamber, a pneumatic pilot valve having a port communicating with said chamber, a valve member movable relative to said port for governing the pressure in said chamber, means under the joint control of said positionable member and said expansible contractible chamber so that pressure in the expansible contractible chamber corresponds to the position of said positionable member, movable exhibiting means, additional means responsive to changes in pressure in said expansible contractible chamber for moving the exhibiting means, and means for varying the effective length of said spring to thereby vary the change in position of said exhibiting means produced by a given change in pressure in said expansible contractible chamber, and said receiver including movable exhibiting means operated by changes in pressure in the pneumatic pressure transmitting conduit.

PAUL S. DICKEY.
ROBERT W. BOARMAN.